United States Patent [19]

Cummings

[11] 4,102,325

[45] Jul. 25, 1978

[54] TEMPERATURE CONTROL IN SOLAR-TO-THERMAL ENERGY CONVERTERS

[75] Inventor: Richard D. Cummings, Reading, Mass.

[73] Assignee: Daystar Corporation, Burlington, Mass.

[21] Appl. No.: 793,495

[22] Filed: May 4, 1977

[51] Int. Cl.² ............................................... F24J 3/02
[52] U.S. Cl. ..................................... 126/270; 165/32; 165/106; 126/271
[58] Field of Search .................. 126/270, 271; 165/32, 165/35, 39, 48, 96, 106

[56] References Cited

U.S. PATENT DOCUMENTS

| | | | |
|---|---|---|---|
| 4,043,317 | 8/1977 | Scharfman | 126/270 |
| 4,046,134 | 9/1977 | Scott | 126/270 |

Primary Examiner—Allen M. Ostrager
Assistant Examiner—Stephen F. Husar

[57] ABSTRACT

Solar-to-thermal energy converter comprising an insulated frame, a solar energy absorber mounted in the frame, a fluid flow heat exchange means thermally coupled to the absorber to carry away as thermal energy the absorbed solar energy, and a window transmissive to solar energy mounted in the frame above the absorber, featuring a temperature actuated heat loss enhancer comprising a fluid flow heat pickup means thermally coupled to the absorber, an exterior heat rejector element, a fluid flow heat rejector means thermally coupled to the heat rejector element, and a thermally actuated valve connected between said fluid flow pickup and rejector means to form a fluid flow circuit separate from the fluid flow heat exchange means and powered by the heat-produced differential buoyancy forces of the fluid therein when the valve is open.

13 Claims, 6 Drawing Figures

TEMPERATURE CONTROL IN SOLAR-TO-THERMAL ENERGY CONVERTERS

BACKGROUND OF THE INVENTION

This invention relates to temperature control in solar-to-thermal energy converters.

Various means have been used in conjunction with solar-to-thermal energy converters to prevent high temperature damage to the converters.

Some converters have been designed to withstand maximum achievable temperatures (stagnation temperatures). The result has been the use of costly materials in the design, or the development of a collector with a very low solar energy conversion efficiency.

Some systems have been designed to limit collector temperature by means of external heat rejecting heat exchangers actuated at desired temperature levels. The result has been the use of costly ancillary parts in the system, with the additional disadvantage of being dependent on the proper function of the collector heat exchange fluid loop, malfunction of the temperature limiter occurring when the system fluid loop is empty of fluid.

SUMMARY OF THE INVENTION

The invention makes possible the use of low cost materials in the construction of highly efficient solar-to-thermal energy conversion collectors by providing in a novel way for the rejection of thermal energy at temperatures lower than the destruction temperature of the materials used in collector construction. A heat rejecting, temperature limiting system is provided which is durable, leak resistant, reliable, dimensionally stable at operating temperatures, and easily and inexpensively manufactured, preferably self-contained in the collector, and which operates completely independently of the regular heat exchange fluid system of the collector.

In general, the invention features, in a solar-to-thermal energy converter comprising an insulated frame, a solar energy absorber mounted in the frame, a fluid flow heat exchange means thermally coupled to the absorber to carry away as thermal energy the absorbed solar energy, and a window transmissive to solar energy mounted in the frame above the absorber, that improvement consisting of a temperature actuated heat loss enhancer comprising a fluid flow heat pickup means thermally coupled to the absorber, an exterior heat rejector element, a fluid flow heat rejector means thermally coupled to the heat rejector element, and a thermally actuated valve connected between said fluid flow pickup and rejector means to form a fluid flow circuit separate from the fluid flow heat exchange means and powered by the heat-produced differential buoyancy forces of the fluid therein when the valve is open.

In preferred embodiments, the fluid flow heat pickup means is a set of parallel flow passages running lengthwise along the undersurface of the absorber plate and manifolded at opposite ends; the fluid flow heat rejection means is a set of parallel flow passages running lengthwise along the frame bottom plate (which acts as the rejector element) and manifolded at opposite ends; the thermally actuated valve is connected between the upper (when the collector is installed) heat pickup and rejection manifolds; and the bottom pickup and rejection manifolds are connected on the side of said collector opposite the valve. The invention is applicable to all types of flat plate solar collectors and can have temperature actuation at as low as 140° F or as high as 250° F.

In other embodiments external finned radiators are provided along the upper (when installed) end of the collector, to improve heat rejection and reduce temperature gradients. In some embodiments the radiator unit includes the heat rejection loop, which is thus external to the collector.

Other advantages and features of the invention will be apparent from the description and drawings herein of a preferred embodiment thereof.

DESCRIPTION OF PREFERRED EMBODIMENTS

Figure 1:
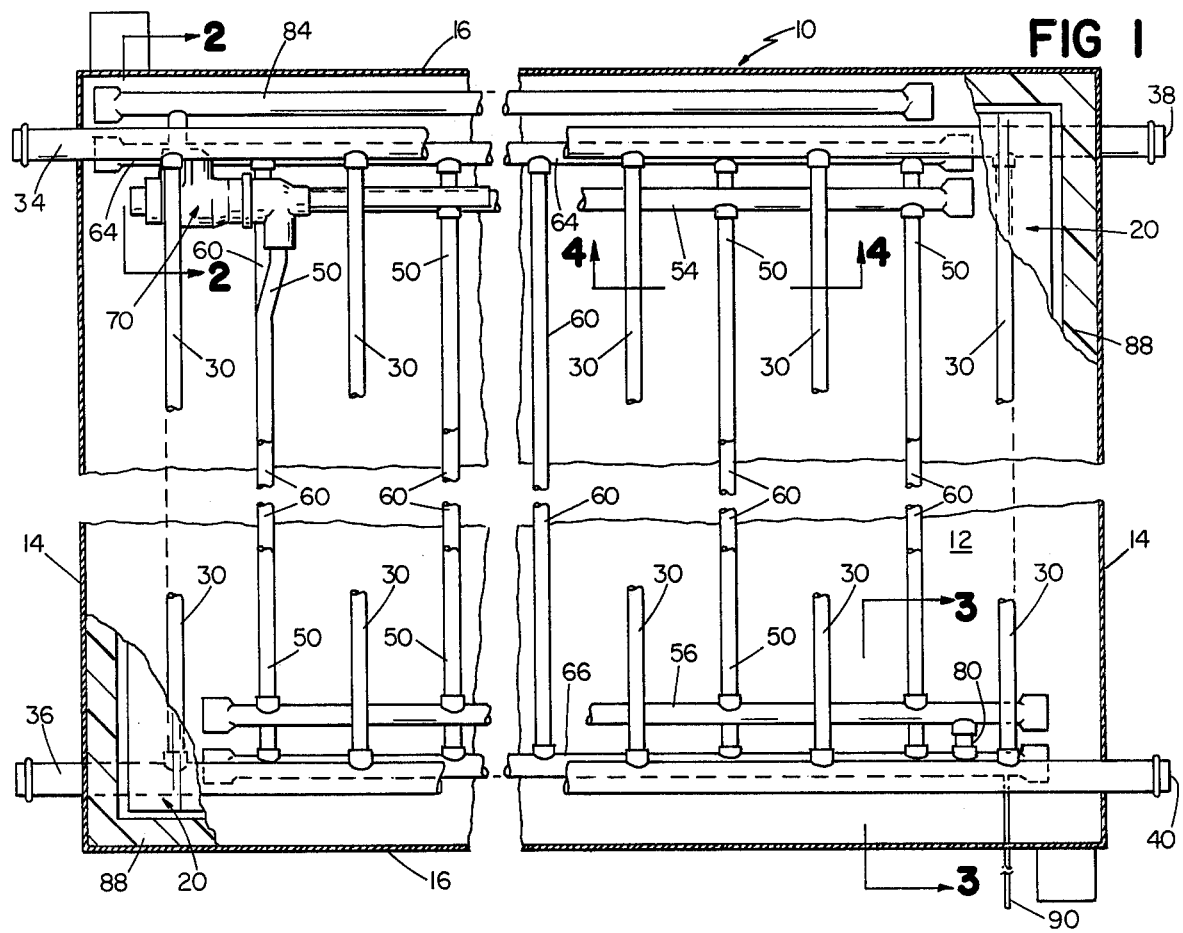
FIG. 1 is a sectional plan view, partially broken away, taken along 1—1 of FIG. 2.
Figure 3:
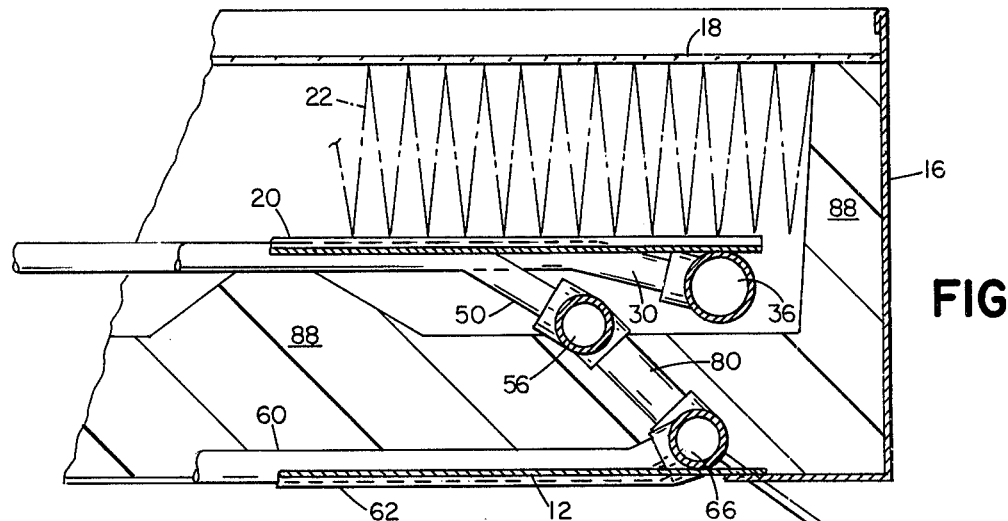
FIG. 3 is a sectional view taken along 3—3 of FIG. 1.
Figure 4:
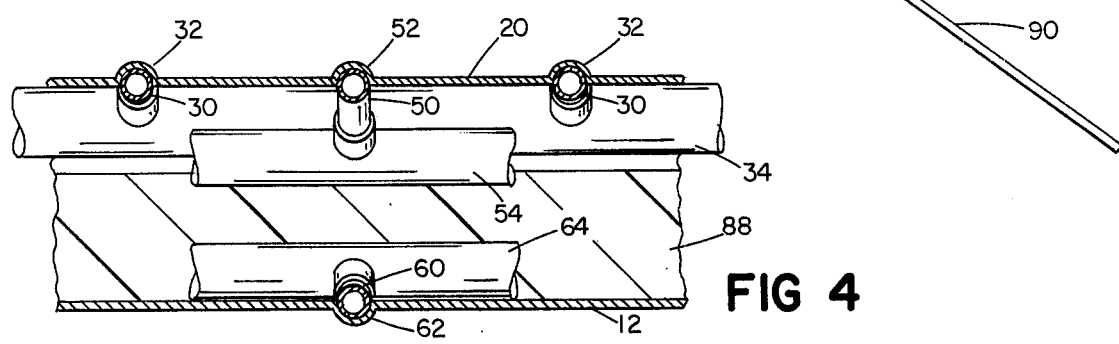
FIG. 4 is a sectional view taken along 4—4 of FIG. 1.
Figure 2:
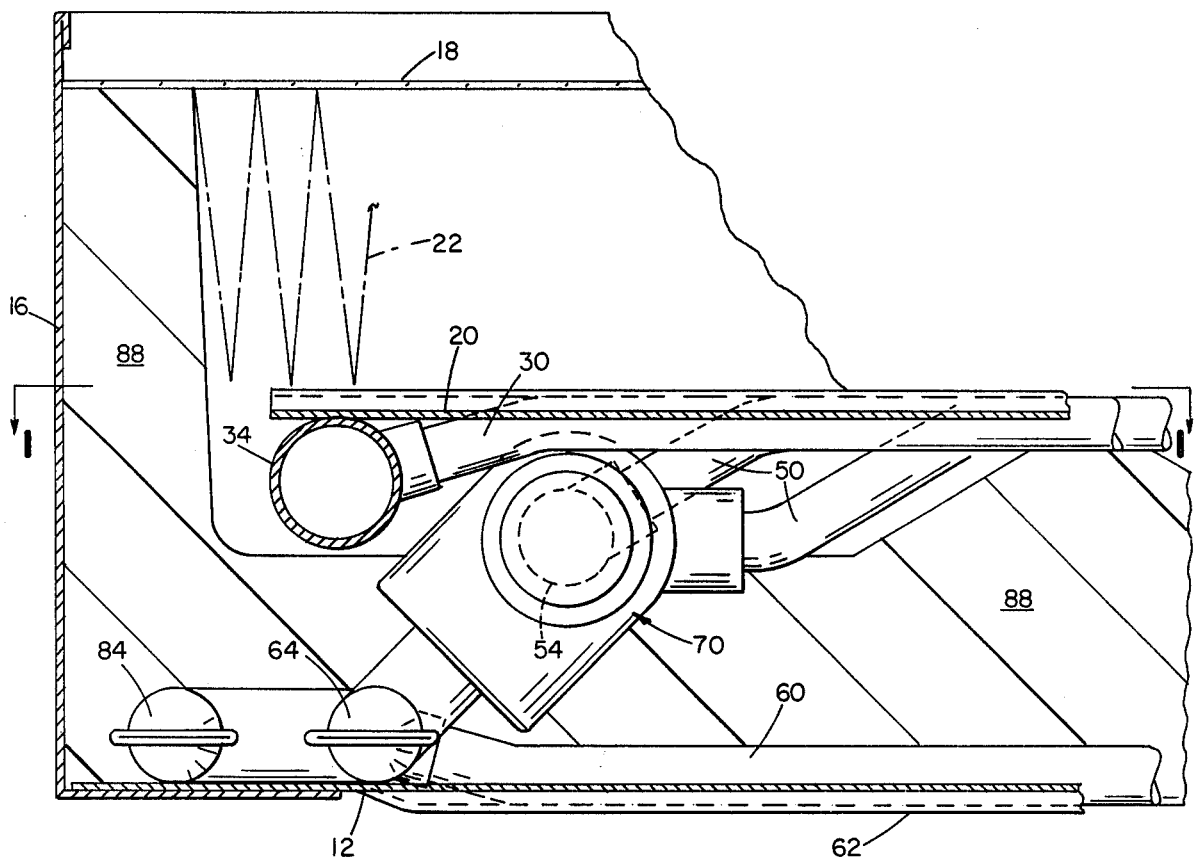
FIG. 2 is a sectional view taken along 2—2 of FIG. 1.

Referring to FIGS. 1-4, collector 10 has an outer casing consisting of aluminum bottom 12, side walls 14, and end walls 16. Transparent window 18 closes the top of the casing. Blackened copper absorber plate 20 is supported within the casing spaced below window 18. Transparent, pleated heat trap 22 is mounted between window 18 and plate 20, in a manner and for the purposes described more fully in U.S. Pat. No. 4,019,496, hereby incorporated by reference.

A heat exchange loop is formed by spaced, parallel copper tubes 30 which are soldered in channels 32 formed in the underside of plate 20 and are connected at their opposite ends to manifolds 34 and 36 which run parallel to end walls 16. These manifolds extend through side walls 14 to provide inlet 38 and outlet 40 for liquid circulation through the loop to transfer heat to a point of use.

A high temperature heat pickup loop is formed by spaced, parallel copper tubes 50 which are soldered in channels 52 formed in the underside of plate 20 between each pair of channels 32 and are connected at their opposite ends to manifolds 54 and 56.

A heat rejection loop is formed by spaced, parallel copper tubes 60 which are connected (with epoxy) in channels 62 formed in the upper side of case bottom 12 and are connected at their opposite ends to manifolds 64 and 66.

At one end of the collector the heat pickup and rejection loops are connected through a temperature controlled valve 70 (Watts #100XL) which has a temperature probe extending into manifold 54. The characteristics of the valve are such that it is fully closed when the probe is at low temperature, opens partially at about 210° F, and opens progressively to a full open position at about 220° F.

At the diagonally opposite corner of the collector the pickup and rejection loops are connected through a small tube 80.

Except for inlet 38 and outlet 40, and valve 70 and pipe 80, all manifolds are closed at their ends.

An expansion chamber 84 is connected to manifold 64.

Foamed plastic insulation 88 covers bottom 12 and the heat rejection loop, and extends up to just below the absorber plate, and along end and side walls 14 and 16.

In manufacture, after the heat rejection loop is in place the insulation is foamed in, leaving cutouts for valve 70 and tube 80, which cutouts are filled in after the pickup and rejection loops are connected.

A fill tube 90 extends from manifold 66 for filling the pickup and rejection loops with liquid by first evacuating air from the loops through that tube and then allowing liquid to be sucked into the loops. After filling, tube 90 is cut off and the opening sealed.

The collector is installed in an oblique position with manifolds 54 and 64 (and valve 70) above manifolds 56 and 66, mounted on standoffs (not shown) so that air can circulate under bottom 12.

In operation, as plate 20 heats up and expands the liquid in the pickup loop, some of that liquid flows through tube 80. If the temperature in the plate 20 reaches 210° F valve 70 opens and the liquid density differential (due to the temperature differential) between the pickup and rejection loops causes liquid to circulate between those two loops. Heat is thus transferred to bottom 12, which acts as a heat rejection plate and dissipates excess heat to the atmosphere. When sufficient heat has been dissipated to cool the plate 20 below 210° F, valve 70 closes.

Figure 5:
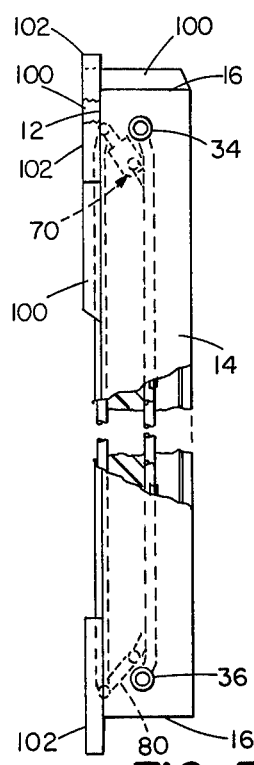
FIG. 5 is a side elevation, partially broken away, of a second embodiment.

In the embodiment of FIG. 5 fins 100 are connected to rejection plate 12 at the upper (when installed) end of the collector, and extend around along end wall 16, in an L-shaped arrangement. The fins increase the heat rejection rate of the rejection loop. Mounting standoffs 102 are provided at the other end of the collector.

Figure 6:
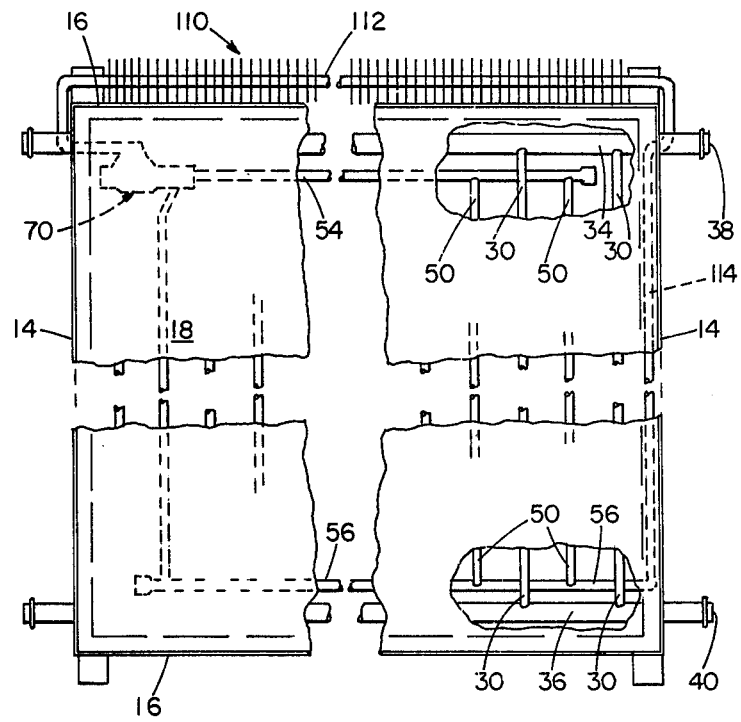
FIG. 6 is a plan view partially broken away, of a third embodiment.

In the embodiment of FIG. 6 the heat refection loop of FIGS. 1-4 is replaced by an exterior baseboard-style finned radiation unit 110 (which constitutes the heat rejection loop) mounted along the upper (when installed) end wall 16. Unit 110 has a central fluid flow tube 112 connected at one end to valve 70 (in place of the FIGS. 1-4 connection of valve 70 to manifold 64) and at the other end to a return tube 114 which runs along the side wall 14 opposite valve 70 and terminates in a connection to heat pickup manifold 56.

Because in FIG. 6 heat is rejected to the atmosphere from the end of the collector, rather than from all along its bottom, the collector can be flush mounted on a roof. Also, because the entire rejector loop is along the upper end of the collector, pumping forces are increased, in turn increasing the rate of heat rejection and reducing temperature gradients in the system. To a lesser extent these advantages are also present in FIG. 5.

Other embodiments are within the following claims.

What is claimed is:

1. In a solar-to-thermal energy converter comprising an insulating frame, a solar energy absorber mounted in said frame, fluid flow heat exchange means thermally coupled to said absorber to carry away as thermal energy the absorbed solar energy, and a window transmissive to solar energy mounted in said frame above said absorber, that improvement consisting of a temperature actuated heat loss enhancer comprising
   fluid flow heat pickup means thermally coupled to said absorber,
   an exterior heat rejector element,
   fluid flow heat rejection means thermally coupled to said element, and
   a thermally actuated valve connected between said pickup and rejection means to form a fluid flow circuit separate from said fluid flow heat exchange means and powered by heat-produced differential buoyancy forces of the fluid therein when said valve is open.

2. The improvement of claim 1 wherein said pickup means is a set of flow passages running along the undersurface of said absorber into pickup manifolds at opposite ends.

3. The improvement of claim 2 wherein said rejector means is a set of flow passages running along said rejector element into rejector manifolds at opposite ends.

4. The improvement of claim 3 wherein at one end of said collector said pickup and rejector manifolds are connected through said valve, and at the other end of said collector, diagonally opposite from said valve, said pickup and rejector manifolds are connected by a passage.

5. The improvement of claim 4 wherein said rejector element comprises a bottom plate of said frame.

6. The improvement of claim 1 wherein said valve is arranged to open at between 140° F and 250° F.

7. The improvement of claim 6 wherein said valve is arranged to open at 210° F.

8. The improvement of claim 1 wherein said rejector element comprises a bottom plate of said frame.

9. The improvement of claim 4 wherein said collector is installed obliquely with said valve and the manifolds to which it is connected in a raised position.

10. The improvement of claim 1 wherein said rejector means comprises an external tube running along the upper end of said collector, and said rejector element comprises a radiator thermally coupled to said tube.

11. The improvement of claim 10 wherein said radiator is a finned unit.

12. The improvement of claim 8 wherein said rejector element further comprises fins thermally coupled to said plate along the upper end of said collector.

13. The improvement of claim 1 further comprising insulation between said pickup and rejection means.

* * * * *